June 4, 1929.  C. D. SCHMIDT  1,716,090
LINING FOR BRAKES, CLUTCHES, AND THE LIKE
Filed May 14, 1924
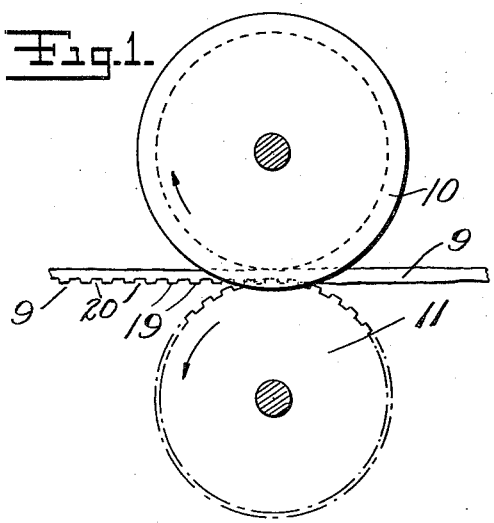
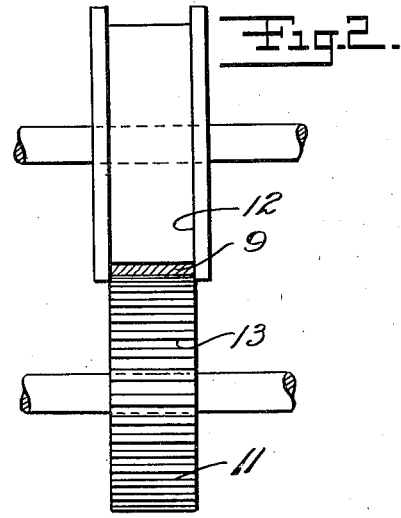
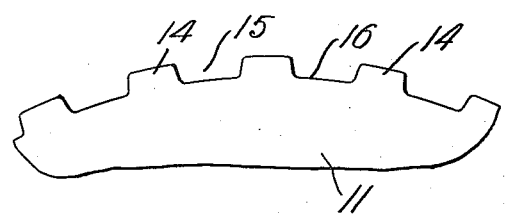
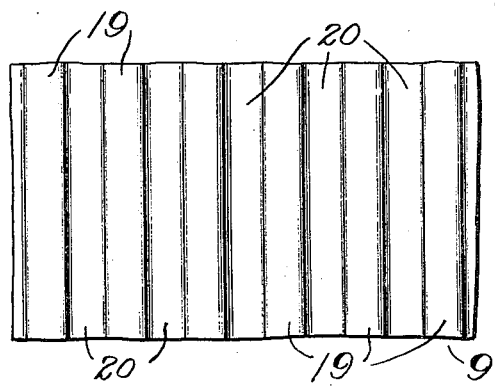
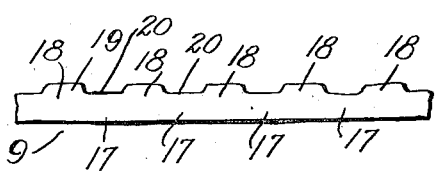
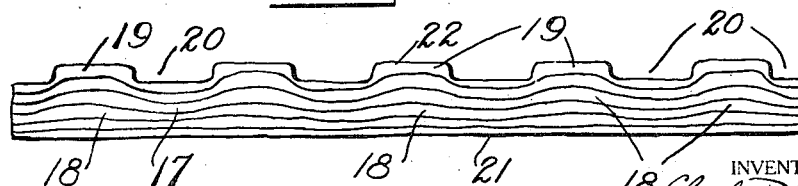
INVENTOR
Charles D. Schmidt
BY
Edwards, Sager & Bower
his ATTORNEYS Patented June 4, 1929.

1,716,090

UNITED STATES PATENT OFFICE.

CHARLES D. SCHMIDT, OF JAMAICA, NEW YORK.

LINING FOR BRAKES, CLUTCHES, AND THE LIKE.

Application filed May 14, 1924. Serial No. 713,148.

This invention relates to bands for brakes, clutches and the like and to a method of producing the same. In the usual band wires are wound with a fibrous material such as asbestos and are then woven into band form and impregnated with a compound acting as a filler to cement the whole together. The band in this form is then run through calendering rolls to give it its final thickness, these calendering rolls acting to smooth the faces of the band or lining by pressure. The result is a homogeneous formation of the lining material between parallel smooth surfaces. When such a lining is fastened in place it is intended to be in continuous uniform contact with its support on one side and the cooperating relatively movable brake surface on the other. In practice inaccuracy in the parts will localize the braking action over a limited area while the remainder of the lining is scarcely affected and the result is an irregular braking action with squeak and chattering of the brake.

The object of this invention is to provide an improved form of brake lining in which the formation will not be homogeneous throughout but will have alternating ridges of varying density so as to give a more evenly distributed and effective braking action. In the brake lining of this invention intervals throughout the length of the lining are compressed with relation to the intermediate portions so that there are successive sections of greater or less density alternating with each other throughout the length of the lining. This is preferably attained by a ridged formation of the back surface of the brake lining so that the lining when in place on its surface will contact with said support at separate intervals with air spaces between said areas of contact.

In the accompanying drawings illustrating the invention—

Fig. 1 is a side view of apparatus having one method of forming a brake band or lining.

Fig. 2 is an end view taken from the right of Fig. 1.

Fig. 3 is a detail side view of one of the rolls shown in Figs. 1 and 2.

Fig. 4 is a plan view of a portion of a brake lining.

Fig. 5 is a side view of the same, and

Fig. 6 is an enlarged longitudinal sectional view of the brake lining.

In the specific embodiment of the invention shown in the drawings the woven and impregnated material of the lining as shown at 9 is fed from the right to the rolls 10 and 11. The roll 10 is formed with a groove 12 to fit the sides of one surface of the lining and the roll 11 fitting within the sides of the groove 12 is provided with a series of teeth or projections 14 with intermediate open spaces 15. The lining is passed through these rolls under heavy pressure so as to be compacted thereby and the surface of the lining in contact with the roll 10 is formed smooth and flat while the opposite surface of the lining is ridged or ribbed by the action of the teeth or projections 14 of the roll 11. The spaces 15 between the teeth 14 are preferably deep enough so that the surface 16 between the teeth 14 does not exert any substantial compression on the surface of the lining.

The portions 17 of the lining which are compressed between the bottom of the groove 12 and the teeth 14 are rendered more compact corresponding to the spacing of the teeth 14 and between these denser compact portions are intervening thicker portions 18 corresponding to the spaces 15 of the roll 11. One surface of the lining thus has a series of ridges 19 alternating with depressions 20 and these ridges and depressions preferably extend all the way across the lining though of course various forms and designs of the raised and depressed portions may be adopted as desired depending upon the particular configuration of the teeth or projections 14 of the roll 11.

While the effect of the toothed roll is more effective on one surface than on the other the compressive action of the teeth extends throughout compact portions 17 of the band making these portions harder and firmer than the intermediate uncompressed or less compressed portions 18. The formation of the teeth 14 is preferably such as not to actually disrupt the fibers or strands of the lining but simply to distort these strands into successive portions of greater and less compactness as indicated in Fig. 6. The continuity of the lining structure is therefore not interrupted and the full strength of the lining is maintained.

In service it is intended that the flat surface 21 of the lining will be the surface actually in contact with the cooperating braking member while the opposite ridge surface 22 is in contact with the supporting member for the lining. Such support member is not ridged so that the depressions 20 of the lining are out of contact with the support and leaving open air circulating and cooling spaces extending crosswise of this back surface of the lining.

The lining of this invention will contact with the supporting member for only part of its area namely, the raised portions or ridges 19, while retaining the full bearing or braking area on the relatively movable part. With braking material as most generally constructed of asbestos woven yarn interwoven with brass or metallic wires, the brake lining described above will at its points of contact with the supporting member be less solid and more resilient than the depressed portions 17, tending to create a cushioning effect and causing the lining to conform more readily to the relatively movable member. The heat generated with a braking action rotating through the raised portions of less dense woven lining at these points will radiate more readily over the entire supporting member reducing the temperature of the lining.

The depressed portions 17 are compressed to a higher degree than the raised portions and offer greater resistance to wear because of the great density of the material at these sections. These dense intermediate portions 17 control the wear of the lining since it is known that the denser the material the longer will be its life. This lining is a heterogeneous unitary strip offering alternating soft and hard sections which tend to increase the effective friction without raising the resultant temperature. Since this material is interwoven with brass wires and these wires in each of the strands of asbestos yarn are caused to become arched as shown in Fig. 6 great strength is developed by the formation shown were the compact arches of the portions 17 supporting these intermediate portions from the portions 18 directly resting against the member carrying the lining. This develops added resiliency and aids in causing the lining to conform in proper relation to the cooperating supporting and braking members. The result is a lining densely and loosely compressed at separated areas with the loosely compressed areas contacting with the supporting member and acting as resilient elements that yield when the load is applied and to bring about contact throughout the entire braking area. The back portion of the lining along the supporting member is relatively less dense and more resilient and the front portion of the lining for engagement with the cooperating braking member is more dense and less resilient so that the lining as a whole is divided longitudinally into a rear cushion portion and a front wearing portion. Applicant's lining therefore combines smoothness and efficiency in braking action with long life in service.

I claim:—

1. A lining for brakes, clutches and the like comprising a unitary strip of material for attachment to the brake and having a flat braking surface and one face formed by relatively resilient less dense material and the opposite face of relatively dense less resilient material.

2. A lining for brakes, clutches and the like comprising a unitary strip of material for attachment to the brake and having a flat braking surface and a plurality of separate portions of different density.

3. A lining for brakes, clutches and the like comprising a unitary strip of material for attachment to the brake and having a flat braking surface and a plurality of separate portions of different density formed by compressing certain portions with relation to the remainder of the strip.

4. A lining for brakes, clutches and the like comprising a unitary strip of material for attachment to the brake and having a flat braking surface and a series of portions of different density formed by compressing separated portions with relation to the intermediate portions.

5. A lining for brakes, clutches and the like comprising a unitary strip of material for attachment to the brake and having a flat braking surface and a plurality of separate portions of different density, said strip having its back surface formed with ridges and depressions between said ridges.

6. A lining for brakes, clutches and the like comprising a unitary strip of woven material for attachment to the brake and impregnated with a substance leaving the strip pliable, said lining having different portions of different relative density so that the lining as a whole is heterogeneous in structure.

7. A lining for brakes, clutches and the like comprising a unitary strip of woven material for attachment to the brake and impregnated with a substance leaving the strip pliable, said lining having its braking surface as a whole formed of relatively dense less resilient material and its back face formed as a whole of relatively resilient less dense material.

8. A lining for brakes, clutches and the like comprising a unitary strip of woven material for attachment to the brake and impregnated with a substance leaving the strip pliable, said lining having its back surface formed of a series of portions of different density.

9. A brake lining for attachment to the brake comprising material heterogeneous in structure and having an irregular supporting surface with depressed areas relatively dense and raised areas relatively pliable and resilient, and a flat surface on the other side forming the braking surface of the lining.

10. A brake lining for attachment to the brake comprising material of heterogeneous structure having a thin dense solid portion forming the braking portion of the lining and with a rear supporting portion formed as a relatively resilient pliable mass for compensation of inequalities between the lining and its frictional cooperating member.

11. A heterogeneous brake lining for attachment to the brake comprising material having a flat braking surface and an irregular supporting surface with raised portions of relatively less density and depressed portions of greater density so as to be yieldable to compensate for inequalities of the circles of the frictional and supporting members.

CHARLES D. SCHMIDT.